United States Patent [19]
Kao et al.

[11] 4,134,641
[45] Jan. 16, 1979

[54] SELF CENTERING CONNECTOR DESIGN

[75] Inventors: Charles K. Kao; James E. Goell, both of Roanoke County, Va.

[73] Assignee: International Telephone & Telegraph Corp., Nutley, N.J.

[21] Appl. No.: 797,721

[22] Filed: May 17, 1977

[51] Int. Cl.² .............................................. G02B 5/14
[52] U.S. Cl. .................................. 350/96.21; 350/96.34
[58] Field of Search ................. 350/96.15, 96.20, 96.21

[56] References Cited

U.S. PATENT DOCUMENTS 3,861,781   1/1975   Hasegawa et al. ................. 350/96.21

FOREIGN PATENT DOCUMENTS 1003253   1/1977   Canada ................................. 350/96.20
1460548   1/1977   United Kingdom ................. 350/96.20

Primary Examiner—John K. Corbin
Assistant Examiner—John D. Lee
Attorney, Agent, or Firm—John T. O'Halloran; Peter C. Van Der Sluys

[57] ABSTRACT

A simple mechanical connector for joining plastic coated optical fibers provides means for stripping the plastic from the fibers and for automatically aligning the fiber cores. The connector houses three equidistantly spaced teeth protruding from the inner surface of the connector. Inserting a plastic coated fiber within the connector causes the plastic material to be displaced by the teeth and causes the fiber to become precisely centered within the connector. When the connector contains teeth members at both ends of the connector a pair of optical fibers can become automatically aligned by inserting one of the fibers into each end of the connector.

15 Claims, 15 Drawing Figures

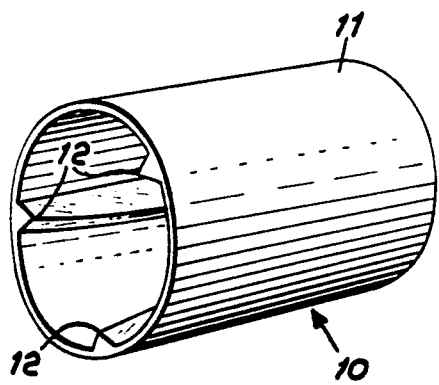
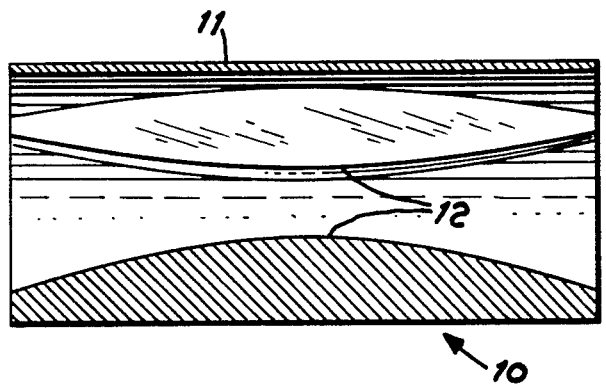
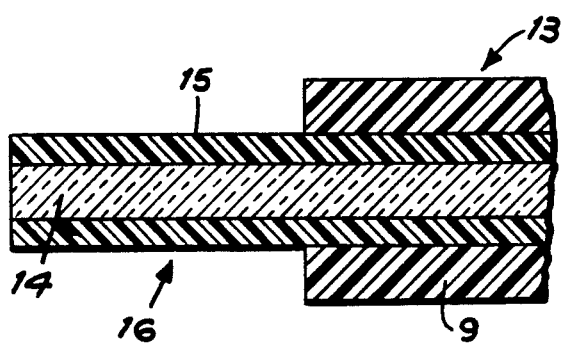
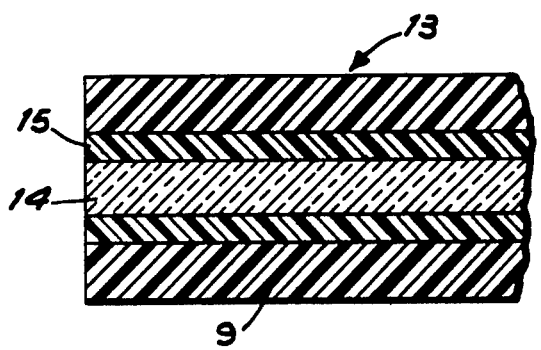
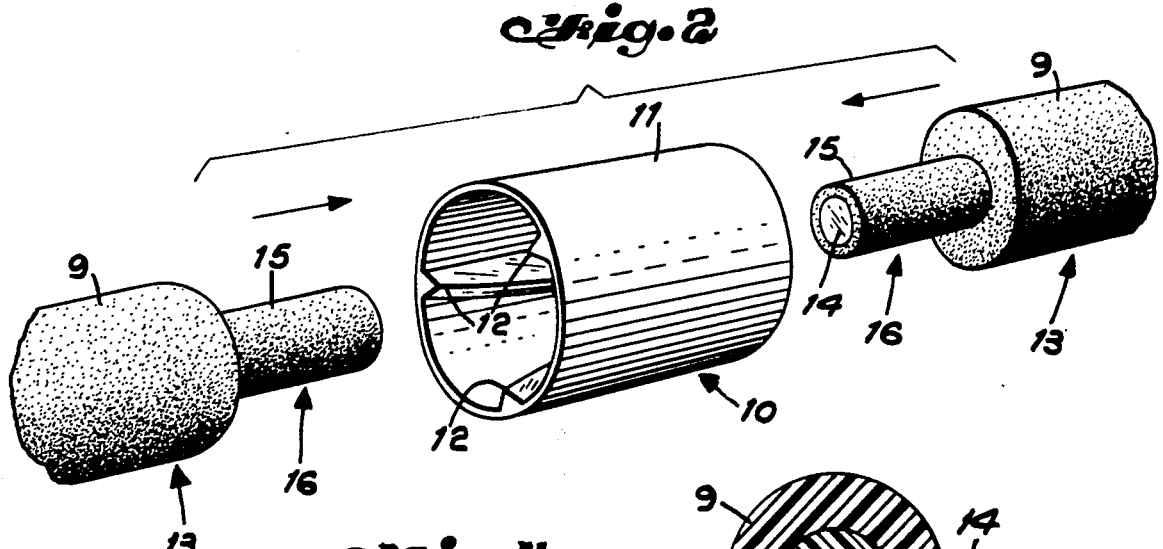
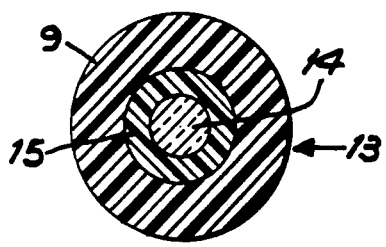

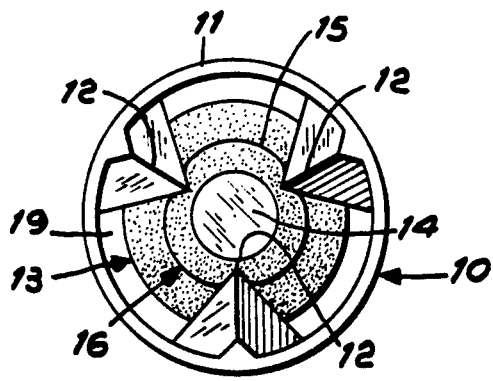
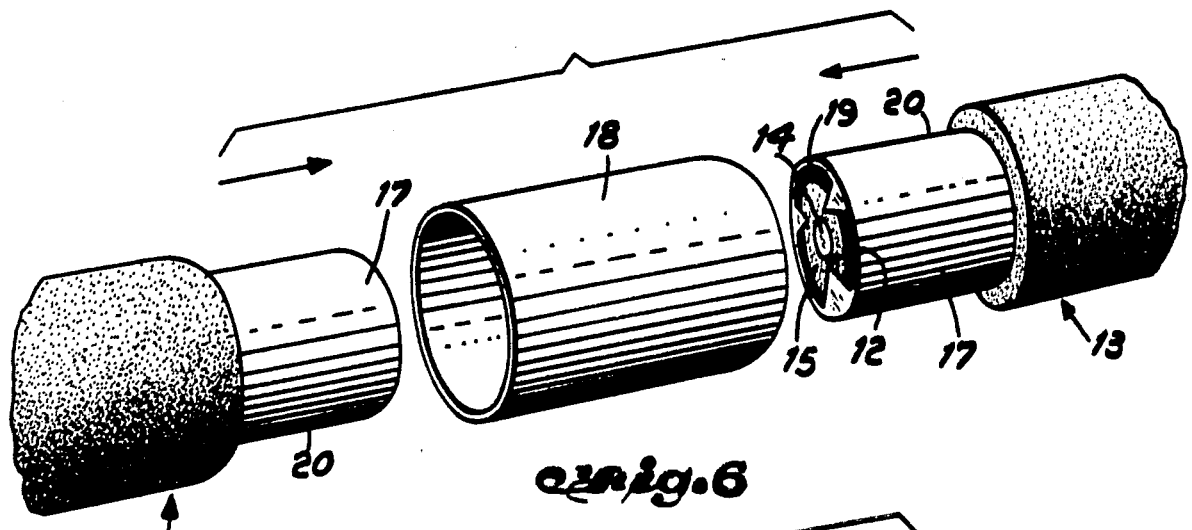
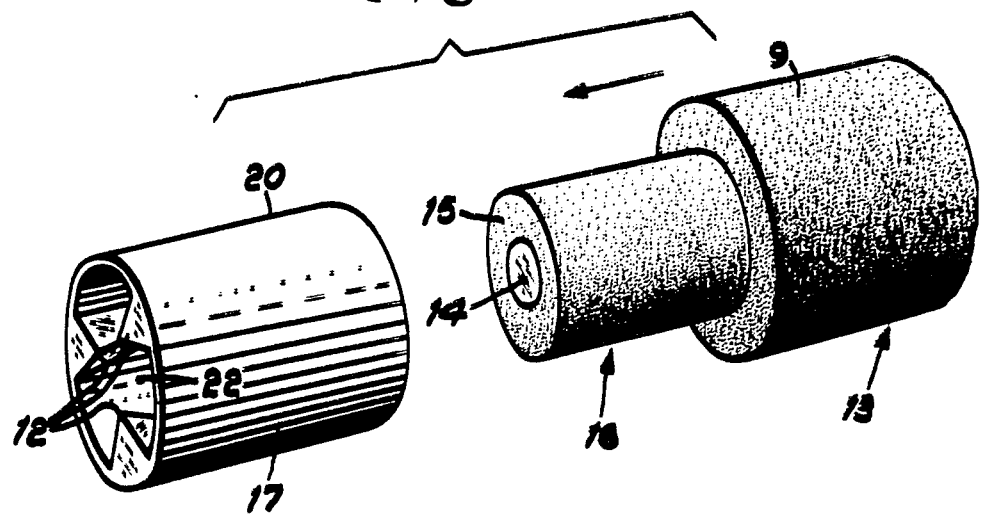

SELF CENTERING CONNECTOR DESIGN

BACKGROUND OF THE INVENTION

Various methods have been proposed for aligning and connecting optical communication fibers without causing a significant loss in light output to occur at the point of connection. The methods generally employed require sophisticated optical alignment instrumentation and complex mechanical assembleges to ensure that the optical cores are in precise alignment.

Relatively inexpensive optical communication fibers containing a high quality glass core and a plastic cladding layer have been developed for relatively short-haul systems where the loss requirements are not prohibitively stringent. The low cost advantage with the plastic clad glass core fibers is lost when expensive mechanical fiber connectors of the aforementioned design are required. The purpose of this invention is to provide a low cost efficient optical fiber connector for use in short-haul optical communications systems.

SUMMARY OF THE INVENTION

A cylindrical optical communications fiber connector provides a built-in centering mechanism for centering the optical fiber relative to the connector and provides for accurate alignment between the optical cores of a pair of fibers connected therein. The self-centering feature comprises a plurality of equidistant extending members on the inner surface of the connector. The ends of the extending members are so designed to remove the surface plastic material from coated silica fibers. The relative degree of materials hardness existing between the glass core and a plastic cladding, forces the plastic to become displaced while keeping the glass material within the geometric center of the connector.

In one embodiment, the connector extending members are tapered inwardly from one end of the connector so that the plastic material becomes more displaced as the fiber is caused to move further within the connector.

Control over the interstices between the extending members and the internal diameter of the connector causes the displaced plastic jacket material to flow into the intersticies and to form a solid entity within the connector.

Further embodiments of the connector of this invention include the design of a ferrule member containing the equidistantly spaced internal extensions for separate attachment to each end of a pair of fibers to be joined. The extending members cause the plastic material to become displaced and the glass core to become centered relative to the external dimension of the cylinder. A pair of optical fibers containing a respective ferrule at each end thereof, readily become aligned within a cylindrical alignment sleeve when each ferruled end is inserted within the sleeve.

Further embodiments contemplate the use of ultrasonic welding or other heat mechanisms to cause the displaced plastic cladding material to fuse and adhere to the connector when a permanent and mechanically strong joint is required.

BRIEF DESCRIPTION OF THE DRAWINGS

FIG. 1 is a front perspective view of an optical fiber connector according to the invention;

FIG. 1A is a side sectional view of the connector of FIG. 1;

FIG. 2 is a front perspective view of the connector of FIG. 1 with a pair of optical fibers in isometric projection therefrom;

FIGS. 2A, 2B and 3 are side and cross sectional views, respectively, of a plastic clad silica optical communication fiber;

FIG. 4 is an end view of the connector of FIG. 1 containing an optical fiber therein;

FIG. 5 is a side perspective view of an alignment sleeve according to the invention with a pair of ferrule-clad optical fibers in isometric projection therefrom;

DESCRIPTION OF THE PREFERRED EMBODIMENT

Figure 6A:
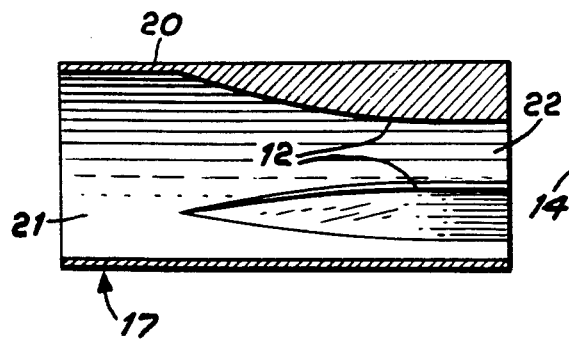
FIG. 6A is a side sectional view of the inventive ferrule of FIG. 6.

FIG. 1 is a front perspective view of the splice connector 10 of this invention consisting of a plastic or metal tube 11 having at least 3 equidistantly spaced centering lobes 12.

FIG. 1A is a side sectional view of the splice connector 10 of FIG. 1 showing the centering lobes 12 grading outwardly from the center in both directions along the tube 11. This is to facilitate the insertion of an optical fiber along the interstices of the centering lobes 12. The centering lobes 12 of FIGS. 1 and 1A are equidistantly located around the periphery of the metal tube 11 and are spaced from the geometric center of the tube 11 to ensure that the optical fiber contacts each of the respective lobes 12 so that the optical fiber will become exactly centered within the tube 11.

FIG. 2A shows a side sectional view of a silicone clad silica optical fiber 13 having a silica core 14, silicone cladding 15 and a polyester jacket 9. In order to utilize the inventive connector 10, the optical fiber 13 is prepared by stripping back the polyester jacket 9 to expose the silicone layer 15 and the silica core 14.

When the stripped end 16 of the optical fiber 13 shown in FIG. 2B is inserted within one end of the connector 10 of FIG. 1, the silicone cladding layer 15 becomes centered. When the stripped end 16 is inserted within one end of the connector 10 of FIG. 1, some of the silicone material of cladding 15 becomes displaced by the mechanical action of the centering lobes 12 and the remaining smaller silicone cladding 15 on the silica core material 14 becomes centered exactly within the center of the centering lobes 12. This centering of the stripped end 16 within the center of lobes 12 effectively centers the core 14 relative to the cent r of tube 11.

FIG. 2 shows the splice connector 10 with a pair of plastic coated optical fibers 13 with stripped ends 16 ready for insertion in both ends of the connector 10. For the connector shown in FIG. 2 both ends contain the tapered centering lobes 12 shown in FIG. 1A to facilitate the centering of both of the stripped ends 16 within the connector 10.

FIG. 3 shows a cross section of a typical plastic clad silica fiber 13 wherein the silica core 14 is surrounded by a plastic cladding material 15 usually of silicone resin.

FIG. 4 shows an enlarged cross section of the splice connector 10 of FIG. 1 with the plastic clad silica optical fiber 13 of FIG. 3 inserted therein. The silicone resin material 15 that becomes displaced by the centering lobes 12 fills in to a certain extent the interstices 19 of the splice connector 10. For this purpose the interstices 19 of the splice connector 10 are made slightly larger than the overall geometry of the stripped plastic clad silica core optical fiber 16 as shown for example in FIG. 2B.

When a non-permanent connection is to be employed, so that the connected optical fibers can be readily removed from either end, the embodiment shown in FIG. 5 is employed. Here the inventive connector comprises a pair of ferrules 17 fitted to the end of optical fibers 13 and includes an alignment sleeve 18. The core 14 is centered within lobes 12 of the ferrules 17 in a manner similar to the connector 10 of FIG. 4. The internal diameter of the alignment sleeve 18 is slightly oversized to the external diameter of the ferrule 17 to ensure a close sliding connection therebetween. The material for both the splice connector 10 of FIG. 1 and the alignment sleeve 18 of FIG. 5 can be of plastic or metal. The plastic material for the embodiment shown in FIGS. 1 and 6 comprises nylon although some polyesters and certain types of PVC type plastics can also be employed. A suitable metal for forming the alignment sleeve 18 and splice connector 10 is stainless steel. One of the requirements for the material for the splice connector 10 and ferrule 17 of this invention is that each centering lobe 12 must be sufficiently durable to contact and separate the silicone cladding 15 without becoming deformed in the process.

FIG. 6 shows the ferrule 17 of FIG. 5 relative to a stripped optical fiber end 16 prior to insertion of the fiber end 16 of optical fiber 13 into one end of the ferrule 17. A side sectional view of the ferrule 17 of FIG. 6 is shown at 6A. The ferrule 17 comprises a hollow cylinder 20 wherein the end 21 for insertion of the stripped optical fiber contains a smooth inner surface whereas the other end 22 contains the centering lobes 12 as indicated. When the stripped end 16 of the optical fiber 13 as indicated in FIG. 6 is inserted into the hollow cylindrical end 21, the stripped fiber end 16 then slides between the lobes 12 and follows the taper of the lobes 12 into the narrow end 22 of the ferrule 17. The cladding material 15 as mentioned earlier becomes "plowed away" from the stripped end 16 and displaced into the interstices 19 existing between each of the three protruding lobes 12 as shown in FIG. 4.

Figure 6B:
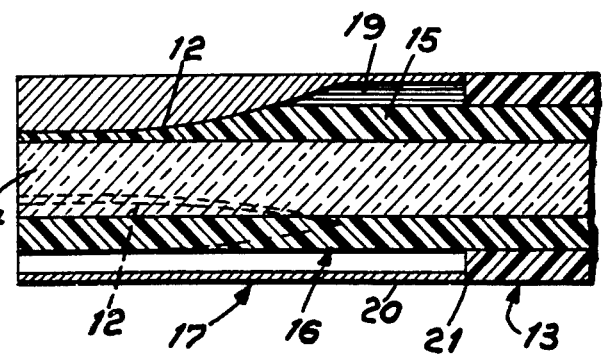
FIG. 6B is a side sectional view of the inventive ferrule of FIG. 6 with an optical fiber inserted therein.

FIG. 6B shows the ferrule 17 of FIG. 5A with the stripped fiber end 16 inserted therein. The length of the stripped end 16 is adjusted relative to the length of the ferrule 17 so that the optical fiber 13 abuts the larger ferrule end 21 and the end of the stripped end 16 abuts the narrowed end 22 of ferrule 17. The diameter of the stripped end 16 is slightly smaller in the confines between centering lobes 12 since some of the cladding material 15 becomes plowed away in the process and displaced into the interstices 19 between the lobes 12 as described earlier. The core 14 becomes centered relative to the diameter of the cylinder 20 of the ferrule 17. This is an important feature of this invention since the core 14 by becoming centered by the three equidistant lobes 12 to the center of the cylinder 20 can be physically and optically aligned with another core similarly centered within another cylinder 20 if both cylinders are confined within a common concentric housing.

Referring again to FIG. 5. The common concentric means for centering both cylinders is the alignment tube 18. The pair of fibers 13, each containing a ferrule 17 are readily connected by inserting both ferrules 17 into each end of the alignment sleeve 18. The outer diameter of the ferrule is machined to a close sliding fit between the inner diameter of the connector tube 18. Since the fiber cores 14 are centered to the ferrule 17 by the geometry of cylinders 20 each core 14 becomes physically and optically aligned in the process of connection.

This embodiment therefore provides a removable connection whereby either or both of the ferrule-ended optical fibers 13 can be readily removed from the alignment sleeve 18.

When a permanent splice is desired the embodiment shown in FIGS. 1 and 1A are employed. In this permanent splice arrangement no ferrule is required and the connector 10 itself contains three equidistantly spaced and inwardly tapering centering lobes 12 wherein the remainder of the connector 10 is hollow. Insertion of prepared ends of optical fibers into opposite ends of the connector 10 will conveniently displace the silicon cladding 15 and align the cores 14 of both fibers 13.

To ensure good optical continuity between the respective silica cores 14 index matching adhesive material is usually employed. The permanent connection between the fiber is afforded by an epoxy type resin that promotes the transmission of light therethrough to the cores by means of the index matching properties of the epoxy.

When a removeable connector is to be employed using the ferrule ended fibers of FIG. 6, an index matching material can be employed with the ferrules to promote optical transfer between the fiber cores. A non-adhesive type index matching fluid is used when the ferrules 17 are inserted within the alignment sleeve 18 to insure that the ferrules 17 can be removed from the alignment sleeve 18.

Although the centering lobes 12 FIG. 1, for example, are shown as projections from the interior surface of the plastic or metal tube 10 the centering lobes 12 can actually consist of sharpened elements similar to the teeth of a pipe-cutting dye so that the teeth effectively cut into the material of the cladding of the stripped optical fiber ends when inserted therein to center the core, and to displace some of the cladding.

The connector 10 having the configuration depicted in FIG. 1A can also be used as a ferrule when only one optical fiber is inserted into one end of the connector 10 and extends therethrough to the other end. When the connector of FIG. 1A is used as a ferrule, a pair of stripped optical fiber ends, each containing one of the connectors of FIG. 1A attached as a ferrule, are in turn inserted within a separate alignment sleeve.

Figure 7:
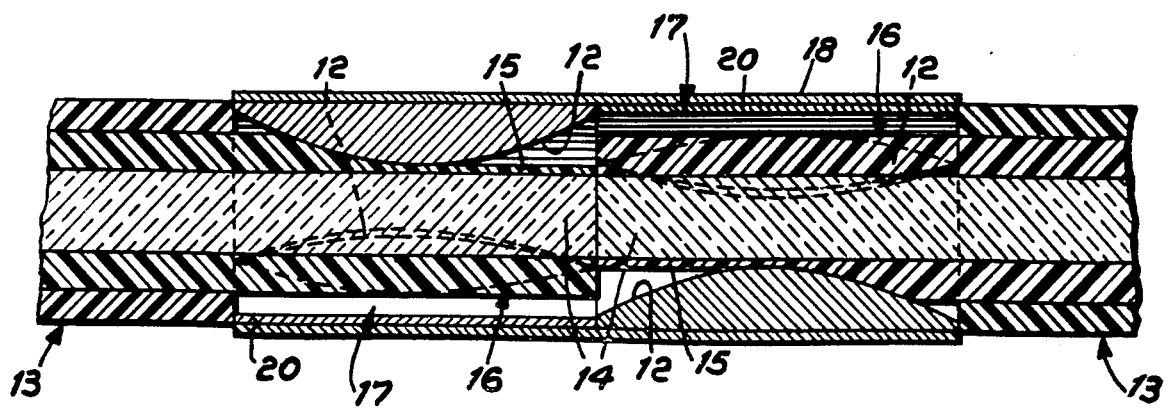
FIG. 7 is an alternate embodiment of the optical fiber connector according to the invention.

This assembly is shown in greater detail in FIG. 7 where a pair of stripped optical fiber ends 16 are shown within the ferrule connectors 17 such that the cores 14 become centered relative to the centering lobes 12 and the cladding material 15 becomes displaced in the insertion process. As described earlier the length of the stripped end portion 16 can be adjusted relative to the length of the connector ferrule 17 so that the core 14 abuts one end of the ferrule 17. When the ferrule-ended fibers 13 are inserted within the alignment tube 18, the cores 14 from both optical fibers 13 become mechanically and optically aligned therein.

Figure 8:
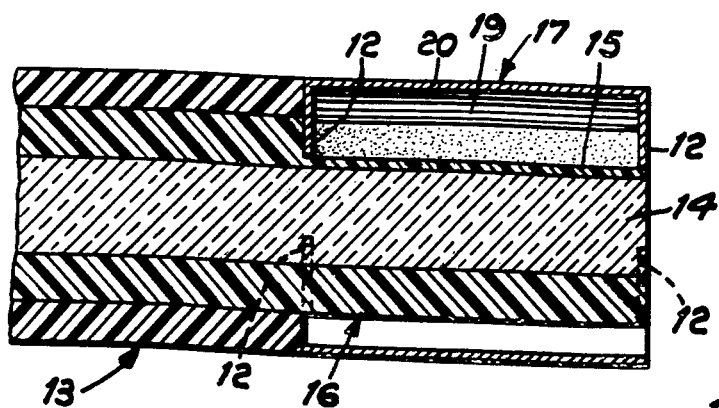
FIG. 8 is a side sectional view of an optical fiber within one embodiment of the ferrule connector of this invention.
Figure 8A:
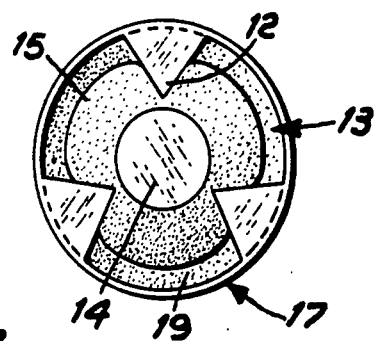
FIG. 8A is an end view of the ferrule connector of FIG. 8.

FIG. 8 shows a simplified design of the inventive ferrule 17 consisting of a hollow cylinder 20 where the protruding teeth 12 are formed from the material comprising cylinder 20. When the material is a hardenable stainless steel, the protruding teeth 12 retain their geometric positions after a stripped optical fiber is inserted therein. The ferrule 17 of FIG. 8A is similar to the ferrule-connector 17 of FIG. 7 since the optical fiber 13 having a stripped end 16 is inserted at one end of the ferrule 17 such that the core 14 centers between the equidistantly spaced protruding teeth 12 and the opposite end of the core 14 abuts the opposite end of the ferrule 17. The cladding material 15 becomes displaced during the insertion process in a manner similar for example to that described earlier for the connector-ferrule 17 of FIG. 7. FIG. 8A is an end view of the ferrule 17 of FIG. 8 with the optical fiber 13 inserted therein. The core 14 is shown centered between the three equidistant protruding teeth 12 and the cladding material 15 is shown displaced within the interstices 19 existing between each of the protruding teeth 12. Although three protruding teeth 12 are shown in the embodiment of FIGS. 8 and 8A, it should be clearly understood that more than three protruding teeth can be utilized providing the teeth are equidistant from each other and the ends of the teeth extend to a sufficient extent to cut into the cladding material 15 and to effectively center the core 14 relative to the diameter of the ferrule 17.

Figure 8B:
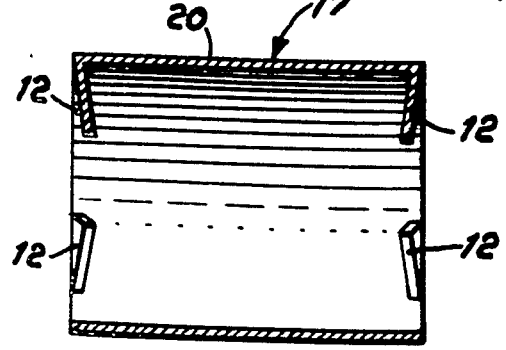
FIG. 8B is a side sectional view of a further embodiment of the ferrule connector of FIG. 8.

FIG. 8B is an alternate embodiment of the ferrule of FIG. 8. The protruding teeth 12 for this embodiment slant inwardly from the ends of the ferrule 17 to facilitate insertion of the fiber end therein. For the embodiments of FIGS. 8 and 8B, the thickness of the protruding teeth 12 is exaggerated for the purpose of description only.

The thickness of the protruding teeth 12 can be equal to the thickness of the material comprising the cylinder 20 and the teeth can be pressed from a closed end hollow continuous cylinder 20. This method of providing the protruding teeth 12 greatly simplifies the manufacturing process. Care must be taken however to ensure that only the teeth members 12 protrude from the ends of the cylinder 20 so as not to interfere with the alignment properties supplied by the protruding teeth 12.

When the ferrule 17 of FIGS. 8 and 8B are to become a permanent attachment to the ends of optical fibers 13, the ferrule can simply be subjected to a source of ultrasonic energy so that the plastic cladding material 15 becomes heated and fused to the cylinder 20 at all points of contact. Other methods for attaching the ferrule 17 of FIGS. 8 and 8B include epoxy and other type adhesives providing that the materials employed do not interfere in any way with the transmission of light through cores 14.

The ferrule and connector devices of this invention are described as bringing optical communication fibers into precise optical alignment. This is by way of example only since the ferrules and connector devices of this invention find application wherever light conducting fibers are to be connected.

We claim:

1. A connector member for an optical fiber of the type that includes a light transmissive core, and an outer layer of plastic material, said connector member comprising:

a rigid hollow tubular member having a predetermined outer surface and a central longitudinal axis; and a plurality of inwardly directed protruding members fixed to said tubular member and terminating at innermost portions disposed in equidistant space relation about the tubular member, said innermost portions being equally spaced from the central axis of the tubular member for contacting the outer plastic layer of the optical fiber, whereby the core of the optical fiber is centered on the longitudinal axis of the tubular member.

2. The connector member of claim 1 wherein the tubular member comprises a cylinder having an outer diameter and a length greater than the diameter.

3. The connector member of claim 1 wherein the protruding members comprise at least 3 teeth.

4. The connector member of claim 3 wherein the teeth extend along the length of the tubular member.

5. The connector member of claim 4 wherein the teeth slope inwardly from at least one end of the tubular member.

6. The connector member of claim 4 wherein the teeth slope inwardly from both ends of the tubular member in an hourglass configuration.

7. A connector member as described in claim 4 wherein each of the teeth terminate along an inner edge.

8. The connector member of claim 3 wherein the protruding members are integrally formed within said tubular member.

9. The connector member of claim 3 wherein the tubular member is hollow and wherein the protruding members form a plane at one end of the tubular member.

10. The connector member of claim 1 wherein the tubular member comprises a plastic.

11. The connector member of claim 1 wherein the tubular member comprises a metal.

12. A connector member as described in claim 1 wherein the outer surface of the tubular member is cylindrical.

13. A connector member as described in claim 1 wherein the protruding members terminate at an inner edge adapted to displace a portion of the plastic layer of the optical fiber.

14. A connector member as described in claim 1 adapted for connecting a pair of optical fibers, additionally comprising a second rigid hollow tubular member having a predetermined outer surface, a central longitudinal axis and a plurality of inwardly directed protruding members fixed to said second tubular member and terminating at innermost portions disposed in equidistant space relation about the second tubular member, said innermost portions being equally spaced from the central axis of the tubular member for contacting the outer plastic layer of the optical fiber, whereby the core of the optical fiber is centered on the longitudinal axis of the tubular member, the predetermined outer surface of the second rigid hollow tubular member conforming to the predetermined outer surface of the first mentioned rigid hollow tubular member; and an alignment sleeve for receiving both rigid hollow tubular members so that the central longitudinal axes thereof are in alignment and the cores of the optical fibers to be connected will be aligned.

15. A connector for a pair of optical fibers having light transmission cores, and an outer plastic material surrounding the fibers comprising:

a pair of first and second cylindrical body members having a plurality of equidistant protruding teeth members extending inwardly from an inner surface of each of said body members for contacting each end of a corresponding pair of optical fibers when inserted therein and centering said optical fibers to the center of said body members by displacing a portion of the outer plastic material surrounding each of said fiber cores; and an alignment sleeve for receiving each of said body members containing said fiber ends therein, each of said body members being inserted at opposite ends of said sleeve, said sleeve receiving said body members internally therein in a sliding fit relation whereby said body members are concentrically aligned within said sleeve and said optical fiber cores become optically and mechanically aligned with each other.

* * * * *